United States Patent [19]

Larson

[11] Patent Number: 4,529,097

[45] Date of Patent: Jul. 16, 1985

[54] INSERT FOR FUEL FILLER RESTRICTOR ASSEMBLIES

[76] Inventor: Russell Larson, 4429 Canyon Dr., Amarillo, Tex. 79109

[21] Appl. No.: 667,563

[22] Filed: Nov. 2, 1984

[51] Int. Cl.³ .............................................. B65D 3/04
[52] U.S. Cl. ................................ 220/86 R; 220/85 F; 138/40
[58] Field of Search .......................... 220/86 R, 85 F; 141/286, 348, 392; 138/40

[56] References Cited

U.S. PATENT DOCUMENTS

| | | | |
|---|---|---|---|
| 3,880,317 | 4/1975 | Arnett | 220/85 F X |
| 4,034,784 | 7/1977 | Ball et al. | 220/86 R X |
| 4,300,699 | 11/1981 | Anhegger | 220/86 R |
| 4,327,783 | 5/1982 | Kanno et al. | 220/86 R X |
| 4,424,839 | 1/1984 | Otani et al. | 220/86 R X |

Primary Examiner—Steven M. Pollard
Attorney, Agent, or Firm—Fidelman, Wolffe & Waldron

[57] ABSTRACT

An insert adapted to rebuilding restrictor assemblies in the fuel filler neck of non-lead gasoline automobiles which comprises an oblong piece of metal formed with sharp corners that may be swedged into the restrictor assembly with an aperture therethrough aligned to the restrictor aperture. The insert serves to down-size a mutilated restrictor aperture to the proper diameter for fit to the standard nozzle of unleaded gasoline dispensers.

4 Claims, 6 Drawing Figures

INSERT FOR FUEL FILLER RESTRICTOR ASSEMBLIES

This invention relates to an insert adapted to rebuilding fuel filler restrictor assemblies.

BACKGROUND OF THE INVENTION

As is well known, catalytic converters are now present in the exhaust system of automobiles of recent vintage to reduce the polluting effect of the engine exhaust gases, and the engines are supposed to employ unleaded gasoline. Presence of lead in the engine exhaust gases is undesirable because lead poisons the catalyst in the converter. However, as of the date hereof, a great many older model automobiles are still in use and as a result, gasoline vendors provide pumps, particularly self-service pumps, for both leaded gasoline and unleaded gasoline to be used at the option of the purchaser.

Unfortunately, leaded gasoline is significantly less expensive than leaded gasoline, which fact encourages cheating by the motorist, through use of leaded gasoline.

Mandatory nozzle size standards have been applied to gasoline vending pumps to prevent dispensing of leaded fuel into the fuel tanks of automobiles equipped with catalytic converters, for reason, of course, that leaded fuel renders catalytic converters permanently ineffective. The nozzle size standard dictates that the delivery nozzles for unleaded fuel shall not exceed 0.85" in diameter while the delivery nozzles for leaded fuel shall not be less than 0.93" in diameter. A companion standard applies to the filling tube of the automobiles and requires an arrangement that limits the amount of leaded fuel that can be delivered by the standard nozzle, before triggering operation of the automatic shutoff mechanism in the filling nozzle of the vending pump to block flow of additional fuel.

The automative industry response to these standards has been factory installation of restrictor assemblies in the automobile fuel filler tube so as to accept therein only the unleaded nozzle size. These assemblies contain an aperture appropriately sized for receiving the nozzle. Presentation of the nozzle tip through the aperture opens a spring-biased flap or door that otherwise would prevent unimpeded flow of the fuel into the gas tank. Efforts to pump gasoline from the oversized leaded gas nozzle causes gasoline to collect above the flap and triggers the nozzle cut-off mechanism. Prior art describing such restrictor assemblies known to the inventor hereof are U.S. Pat. Nos. 3,880,317; 3,911,977; 4,034,784; 4,185,844; and 4,248,279; these patents being incorporated by reference herein for further understanding of the restrictor assemblies to which practice of this invention applies.

By and large the higher cost of unleaded fuel and the perversity of individual motorists, has resulted in modification of a shockingly high number of converter-equipped automobiles to enlarge the filling tube aperture enough to permit acceptance of leaded fuel nozzles. In a word, the restrictor assembly is mutilated to defeat the intent of the above-mentioned standards; the catalytic converters are ruined.

The harm done by mutilation of the restrictor assemblies goes beyond private violation of the pure air laws. In point of fact, virtually all automobiles pass through many hands between purchase as a new car and ultimate destruction as junk. All successor owners of an automobile with a mutilated restrictor assembly also violate the law, including persons who do not want to do so.

In particular, one class of purchases of second-hand automobiles cares very much about whether or not the restrictor assembly in the gasoline filler tube has been mutilated so as to accept leaded gasoline vending pump nozzles. Any automobile dealer who offers for sale a motor vehicle that has been so mutilated faces substantial fines and other sanctions of law. The used-car dealers face a situation which is almost ironic. The manufacturers have provided tamper-resistant fuel filler restrictor assemblies that virtually cannot be removed and replaced. To comply with the law, the used-car dealers many be required to replace the entire gasoline tank assembly, which constitutes a major expense.

The purpose of this invention is to rectify the unfortunate and almost absurd situation of a mutilated, but unremovable restrictor assembly.

The object of this invention is to provide an insert adapted to resize the gas tank neck opening of the filler tube so as to prohibit entry of the leaded gas nozzle.

BRIEF DESCRIPTION OF THE INVENTION

Briefly stated, the resizer insert of this invention comprises a gas tank neck sizer that fits readily into the tank neck, but once in place, becomes virtually impossible to remove, and desirably is difficult to mutilate.

The shape and resiliency of the sizer of this invention generates a spring-effect that allows the resizer to be forced down the filler tube into position against the restrictor assembly, e.g., by hammer blows, whereupon the resizer has become swedged into place to hold firmly against the inside wall of the filler tube tank neck. Basically, the resizer acts as a permanent washer for the tamper-resistant fuel filler restrictor assembly that already is present in the gas tank neck, forming an inseparable portion thereof. Advantageously, the extra layer of metal provided by the resizer makes more difficult (but never impossible, of course) a repeat mutilation of the restrictor asembly so as to once again allow use of the larger leaded fuel nozzle in the filler tube.

Availability of the resizer of this invention allows second-hand automobile dealers to resize gas tank necks expeditiously and inexpensively. They, themselves, will have less difficulty in complying with the law and with the underlying ethical considerations on which the pure air statutes are based.

DISCUSSION OF THE INVENTION

For further understanding of the invention, reference is now made to the attached drawing wherein.

Figure 1:
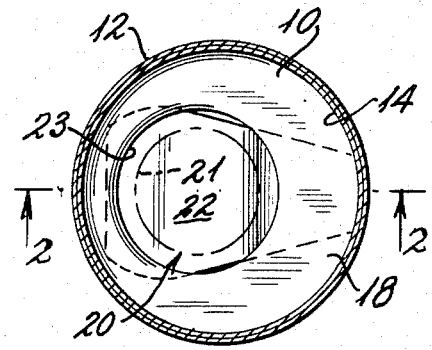
FIG. 1 is a plan view of a restrictor assembly inside a filler tube.
Figure 2:
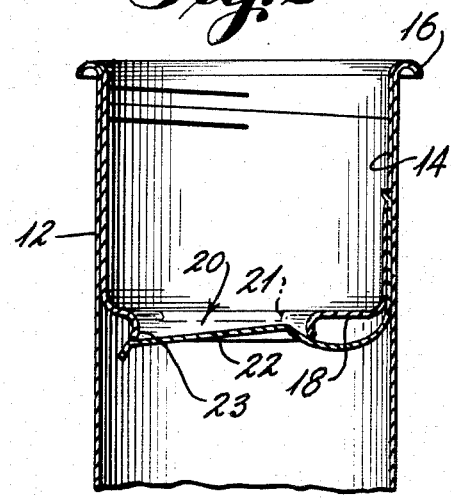
FIG. 2 is a side section taken along line 2—2 of FIG. 1.

Referring now to the drawings and in particular to FIGS. 1 and 2, it may be noted that the typical state-of-the-art restrictor assembly 10 herein illustrated has been shown as mutilated in fashion common to the experiences of the inventor hereof. The restrictor assembly 10 comprises a generally cylindrical body portion 14 having an outer diameter essentially equal to the inner diameter of the mouth of the filler tube 12 in which the restrictor assembly is mounted, typically welded thereto. In the illustrated embodiment of filler tube and restrictor assembly herein assembled, a flange or lip 16 on assembly 10 caps filter tube 12. Threads 15 are provided for seating the filler cap on filler tube 12 and assembly 10. On the whole, the structure herein illustrated resembles the filler neck disclosed in U.S. Pat. No. 4,034,784. The bottom 18 of the restrictor assembly 10 has formed therein an opening 20 that originally was sized 21 (in dash lines) so as to fit the standard nozzle of pumps supplying unleaded gasoline. Beneath and below filler opening 20 is a hinged flap or door 22 whose purpose is to close opening 20. In the event fuel is pumped from an oversized nozzle, a reservoir is created above flap 22 which will actuate the automatic nozzle shutoff. One end of flap 22 extends up between body portion 14 and filler tube 12 to retain the flap in place. A properly sized filler nozzle will press flap 22 open.

Illustrated in FIG. 1 is a typical form of mutilation, namely, deforming and/or chiseling away metal around the periphery of filler opening 20 until the new opening 23 can accept the filler nozzle dispensing leaded gasoline. In a word, the purpose of the restrictor assembly 10 had been defeated.

Figure 3:
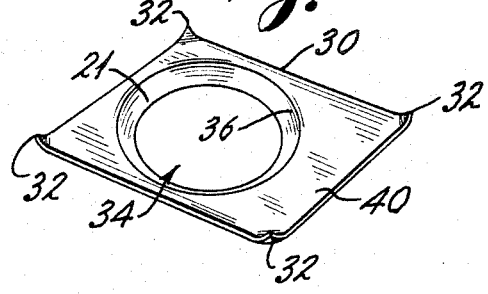
FIG. 3 is a diagrammatic view of the resizer.

Referring now to FIG. 3, wherein is illustrated the resizer 30 of the present invention, it may be seen that resizer 30 comprises an oblong-shaped piece of hard resilient metal. Conveniently standard metal strapping (steel) 0.0375" thick constitutes a convenient material from which to stamp resizer 30. The side edges come together in corners 32 that deliberately are sharp corners. In addition, the corners 32 are bent upward, e.g., 30° and 1/16" bend. In addition, considering the oblong of resizer 30 as initially a planar object, it may be noted that along both the X axis and Y axis of the resizer, a minor degree of upward concavity exists. On the other hand, around the aperture 34, a downwardly extending integral bevel 36 (e.g., 1/16") has been provided.

Although the shape of resizer 30 is geometrically somewhat complex, formation of resizer 30 is a rather inexpensive operation. Resizer 30, properly sized, shaped and perforated with the appropriate aperture 34 can be stamped out in any quantity, stamping being a well-known metal forming technique, and, therefore, discussion thereof is not necessary here.

The diameter 21 of aperture 34 is, of course, critical, being appropriate to the standards for dispensing nonleaded gasoline, namely, more than 0.85" in diameter, yet distinctly less than 0.93" in diameter. The placement of aperture 34 in resizer 30 is, of course, critical in the sense of a manifest need to superpose aperture 34 over the original filler opening 20 in restrictor assembly 10. It so happens that various makes of automobiles have placed the filler opening 20 at varying locations in the bottom 18 of their restrictor assemblies. The location of the aperture 34 herein illustrated corresponds to the aperture location for filler opening 20 in General Motors automobiles. The placement of aperture 34 in resizer 30 and the length and width dimensions of resizer 30 will vary for other makes of automobiles. The exemplary dimensions which have been found suitable for resizing General Motor vehicles are 0.0375"×1.25"×1.50" with aperture 34 ⅞" in diameter and offset so the rim is about 0.5" from side 40 of resizer 30.

Figure 4:
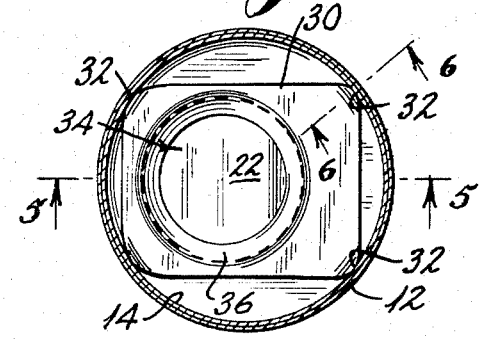
FIG. 4 is a plan view of the filler tube with the resizer in place therein.
Figure 5:
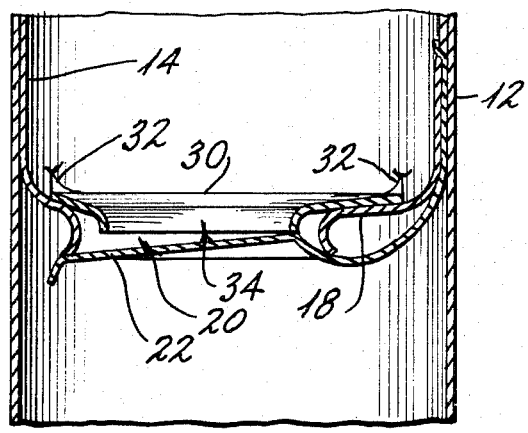
FIG. 5 is side section taken along line 5—5 of FIG. 4.
Figure 6:
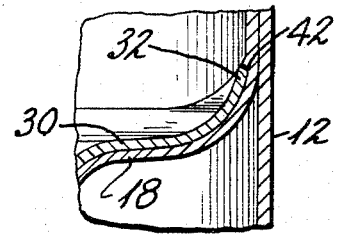
FIG. 6 is a partial side section taken along line 6—6 of FIG. 4.

Resizer 30 is applied by inserting the resizer into restrictor assembly 10 face or concavity up, with bevel 36 of aperture 34 facing down. The bent corners 32 are, of course, facing up. As might be expected, aperture 34 is lined up insofar as reasonably possible with the filler opening 20 of the restrictor assembly (prior to mutilation). Thereafter, resizer 30 is forced into contact with bottom 18 of the restrictor assembly 14 by hammer blows and if needed, through aid of a mandrel. The material from which resizer 30 is formed has sufficient resiliency and deformability to allow resizer 30 to be swedged into place. FIGS. 4, 5 and 6 illustrate the filler neck after insertion therein of resizer 30.

The sharp corners 32 on resizer 30 score and dig into the sidewall 14 of restrictor assembly 10 leaving score marks therein. In a typical instance the corners 32 create pockets 42 holding resizer 30 firmly in place at the bottom of the restrictor assembly 10. The fit is so tight and firm that resizer 30 cannot be removed with ordinary hand tools, such as pliers, screwdrivers, and the like. Overall, the result is a resized filler neck on the automobile that may be more difficult to mutilate than the original restrictor assembly. The metal of the original restrictor assembly 10 supports the superposed metal of resizer 30. Of course, the bevel 36 at aperture 34 provides additional metal to resist repeat mutilation.

Employment of resizer of the present invention will enable dealers in second-hand automobiles to comply with both the legal and ethical standards that apply to the filler tube necks on catalytic converter equipped automobiles both expeditiously and inexpensively.

I claim:

1. A resizer insert adapted to reduce a mutilated filling opening aperture to proper diameter comprising:
   an oblong metal piece having sharp corners bent upward from the face thereof;
   an aperture in the face of said oblong piece of minimum diameter exceeding 0.85" and less than 0.93";
   said aperture further being located in the face of said oblong piece so as to correspond in location to the aperture opening in fuel filler restrictor assemblies, the longitudinal and lateral dimensions of said oblong piece corresponding to the internal diameter of fuel filler restrictor assemblies whereby said oblong piece may be swedged into such a fuel filler restrictor assembly and thereby resize the filling opening so as to fit only filler nozzles for dispensing unleaded gasoline.

2. The resizer of claim 1 wherein the face of said oblong piece is concave along at least one axial dimension thereof.

3. The resizer of claim 1 wherein the corners of said oblong are tilted upward at an angle of about 30° from the face of said oblong.

4. The resizer of claim 1 wherein said aperture is bounded by a downwardly extending bevel.

* * * * *